US006819358B1

(12) United States Patent
Kagle et al.

(10) Patent No.: US 6,819,358 B1
(45) Date of Patent: Nov. 16, 2004

(54) ERROR CALIBRATION FOR DIGITAL IMAGE SENSORS AND APPARATUS USING THE SAME

(75) Inventors: Jonathan C. Kagle, Redmond, WA (US); Gilad Odinak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/299,257

(22) Filed: Apr. 26, 1999

(51) Int. Cl.[7] .......................... H04N 9/64; H04N 17/00
(52) U.S. Cl. .................. 348/246; 348/247; 348/187
(58) Field of Search ................. 348/246, 247, 348/251, 241, 187; 358/504

(56) References Cited

U.S. PATENT DOCUMENTS

| | | | | |
|---|---|---|---|---|
| 4,805,023 A | * | 2/1989 | Younse et al. | 348/247 |
| 5,392,070 A | * | 2/1995 | Endo et al. | 348/247 |
| 5,416,516 A | * | 5/1995 | Kameyama et al. | 348/247 |
| 5,436,659 A | * | 7/1995 | Vincent | 348/246 |
| 5,805,216 A | * | 9/1998 | Tabei et al. | 348/246 |
| 5,995,675 A | * | 11/1999 | Hwang | 348/246 |
| 6,002,433 A | * | 12/1999 | Watanabe et al. | 348/246 |
| 6,307,393 B1 | * | 10/2001 | Shimura | 348/247 |
| 6,340,989 B1 | * | 1/2002 | Oda | 348/246 |
| 6,396,539 B1 | * | 5/2002 | Heller et al. | 348/246 |
| 6,504,572 B2 | * | 1/2003 | Kramer et al. | 348/246 |
| 6,593,961 B1 | * | 7/2003 | Perino | 348/187 |
| 6,611,288 B1 | * | 8/2003 | Fossum et al. | 348/246 |

OTHER PUBLICATIONS

John Watkinson, WinHEC 98, White Paper (Enhanced Version), Converging Computer and Television Image Portrayal, WinHEC 98 Conference, Mar. 1998, pp. 1–23.

* cited by examiner

Primary Examiner—Andrew Christensen
Assistant Examiner—Nhan Tran
(74) Attorney, Agent, or Firm—Westman, Champlin & Kelly, P.A.

(57) ABSTRACT

Disclosed is a digital apparatus, such as a digital camera, which generates a digital representation of an image. The digital apparatus includes an image sensor having an array of pixels. An analog-to-digital converter converts electrical signals from the array of pixels into digital data representative of the image. Information indicative of locations of defective pixels in the pixel array is stored in a pixel defect memory. Compensation circuitry compensates the digital data representative of the image using the information indicative of the locations of the defective pixels. Also disclosed are methods of manufacturing a digital apparatus having compensation for defective pixels.

16 Claims, 5 Drawing Sheets

ERROR CALIBRATION FOR DIGITAL IMAGE SENSORS AND APPARATUS USING THE SAME

BACKGROUND OF THE INVENTION

The present invention relates to digital cameras and other devices that utilize digital image sensors. More particularly, the present invention relates to methods of compensating for defective pixel elements in the image sensor of a device, and to devices implementing the methods.

Digital cameras are an example of devices that use image sensors. Digital cameras use a lens to focus light on a charge-coupled device (CCD) or other types of image sensors. The CCD includes an array of transistors that create electrical currents in proportion to the intensity of the light that strikes them. The transistors constitute the pixels of the image. A single pixel can include only one transistor for black-and-white photography, or can include several transistors for color photography. Generally, as used herein, the term pixel refers to individual sensor elements that can detect brightness (intensity), and optionally color (frequency). The higher the pixel density, the higher the resolution of the resulting image or photograph.

In response to light striking the CCD image sensor, the transistors generate analog electrical signals. An analog-to-digital (A/D) converter converts the analog electrical signals into a digital data stream. A digital signal processor, which functions as an imaging pipeline, adjusts the contrast and detail in the image, compresses the data that makes up the image so that it takes up less storage space, and sends the data to the camera's storage medium.

The image sensor is among the most expensive parts in a digital camera and other types of digital devices. Since a few bad pixels on the image sensor can ruin the quality of a picture, image sensors must have few or no defects. Image sensor defects typically take one of several forms. For example, entire rows or columns of pixels in the image sensor can be defective, being either always on (a dropin) or always off (a dropout). Typically, dropouts and dropins are stuck at full off (black) or full on (white) settings, which are very unusual in real-life photographs. In a photograph taken with a digital camera having a defective row or column of pixels, this defect would appear as a horizontal or vertical stripe.

Another type of pixel defect is bad spots, which are a region of pixels that are defective with dropouts and/or dropins. Also, in addition to these multiple pixel types of defects, individual pixels can be defective. Depending upon the required quality of the image sensor, and upon the location of a defective pixel, a single defective pixel can render an image sensor unusable.

Due to the above-described defects, manufacturing of image sensors frequency results in very low yields. These low yields increase the cost of image sensors, and thus increase the cost of digital cameras and other devices that utilize image sensors.

SUMMARY OF THE INVENTION

The invention includes a digital camera that generates a digital representation of an image, as well as methods of manufacturing the same. The digital camera includes an image sensor having an array of pixels, some of which are defective. An analog-to-digital converter converts electrical signals from the array of pixels into digital data representative of the image. Information indicative of locations of defective pixels in the pixel array is stored in a pixel defect memory. Compensation circuitry compensates the digital data representative of the image using the information indicative of the locations of the defective pixels.

DETAILED DESCRIPTION OF ILLUSTRATIVE EMBODIMENTS

Figure 1:
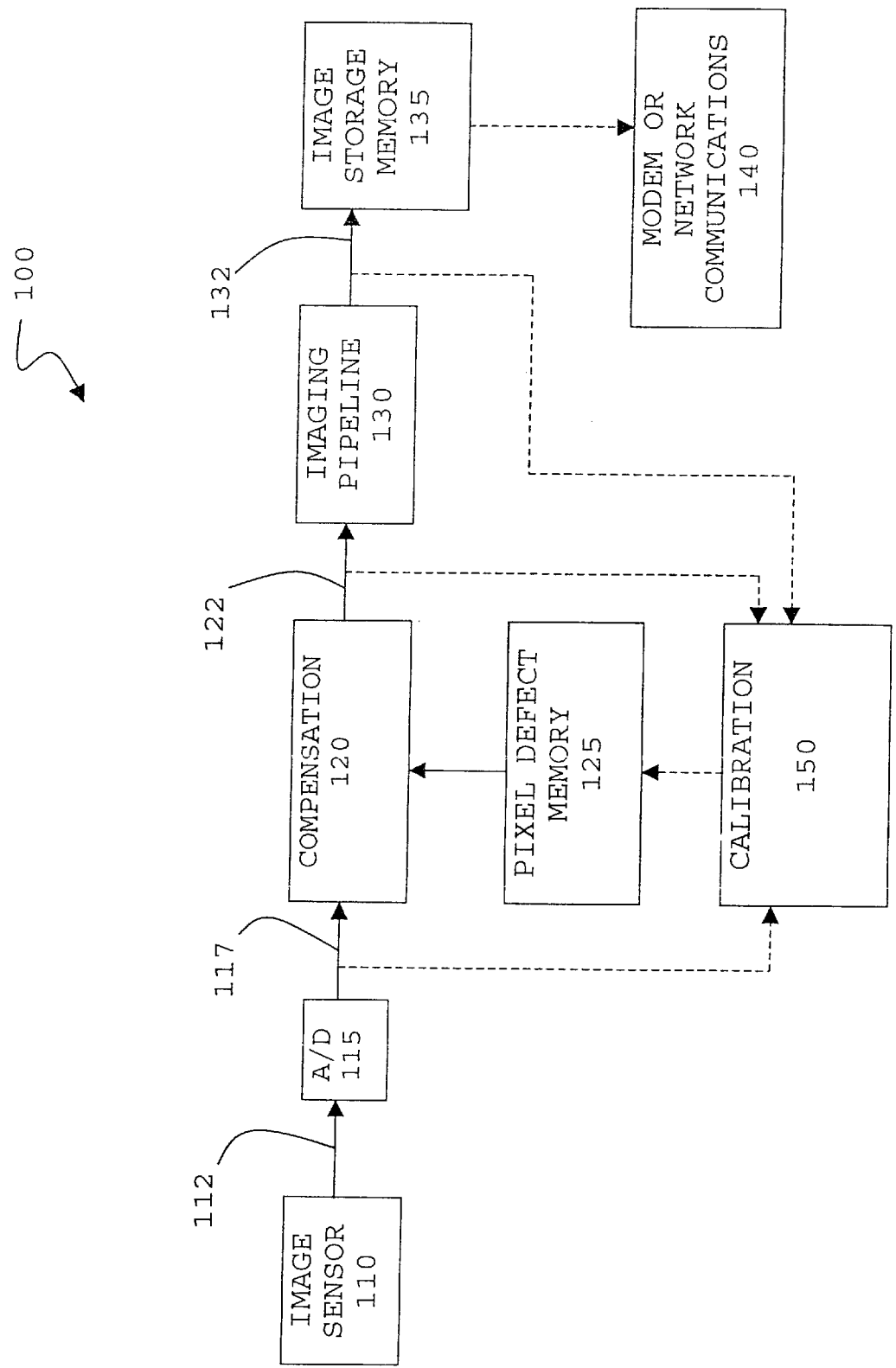
FIG. 1 is a block diagram of a digital camera having compensation for defective pixels in accordance with the invention.
Figure 2:
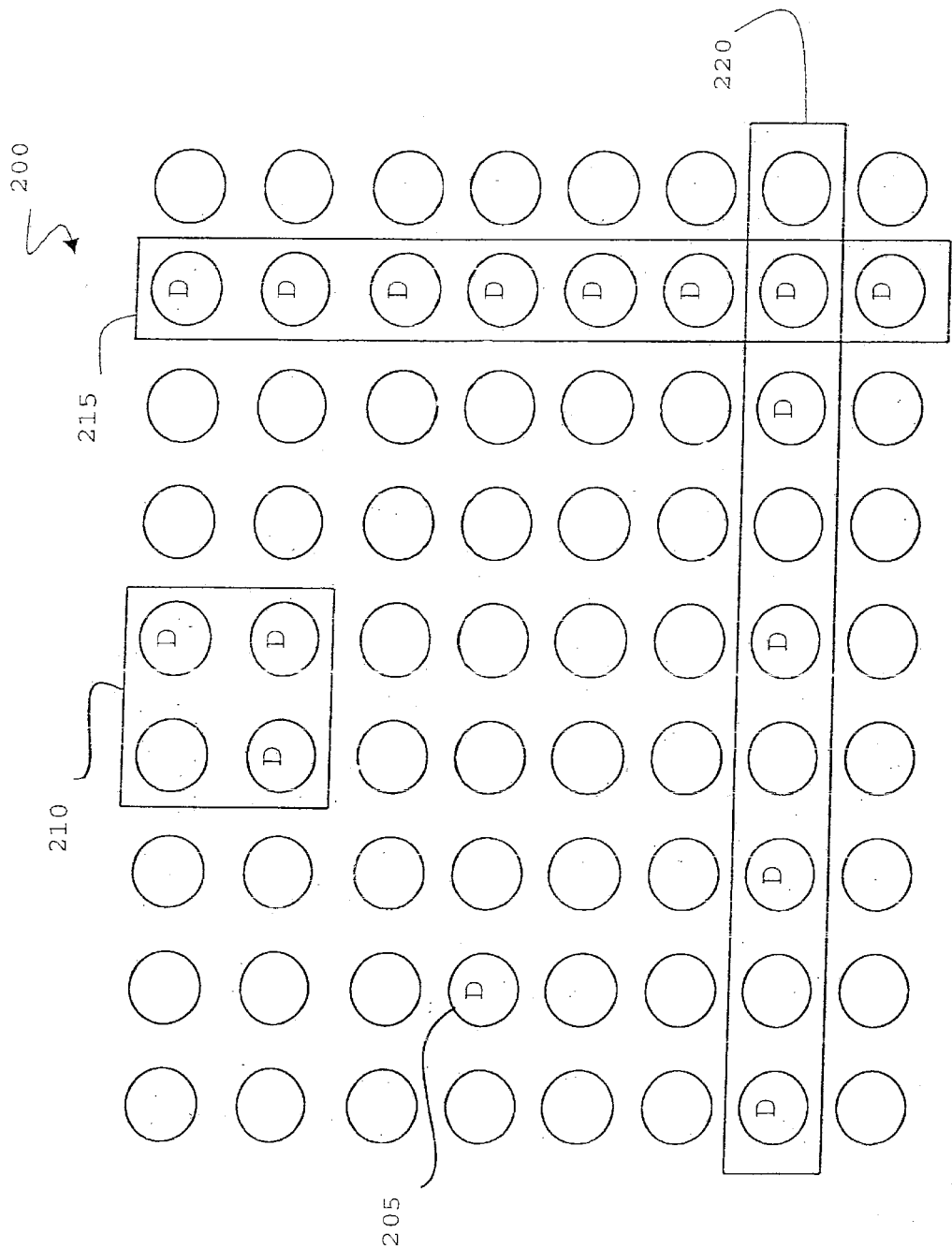
FIG. 2 is a diagrammatic illustration of an image sensor, having defective pixels, used in the digital camera shown in FIG. 1.

FIGS. 1 and 2 illustrate the environment in which the methods of the present invention are utilized. FIG. 1 is a block diagram of a digital camera having an image sensor with defective pixels. FIG. 2 illustrates an image sensor of the type used in the digital camera shown in FIG. 1, and demonstrates the various types of pixel defects that the present invention overcomes. The, present invention includes methods of detection of defective pixels in the image sensor, methods of grouping and storage of the locations of the defective pixels in a pixel defect map memory in a manner that reduces storage and processing requirements, and the compensation of digital images using the defective pixel information. While the invention is illustrated in use in a digital camera, the invention includes other devices that utilize digital image sensors and that implement the inventive methods disclosed and claimed herein.

Digital camera 100 illustrated in FIG. 1 includes image sensor 110, analog-to-digital (A/D) converter 115, compensation circuitry 120, pixel defect memory 125, imaging pipeline 130 and image storage memory 135. Optionally, digital camera 100 can include modem or network communications circuitry 140 for communicating with computers over the Internet or over a computer network. Also, digital camera 100 can optionally include calibration circuitry 150 for identifying defective pixels at times that are typically after the manufacture and testing of camera 100.

Image sensor 110 is a charge-coupled device (CCD) or other type of image sensor having an array of pixels, each providing an analog output indicative of brightness (intensity) of light focused on the pixel by a lens (not shown). The analog outputs of the pixels are provided at output 112. In a color digital camera, different pixels in the image sensor array can be sensitive to different colors (frequencies) of light. The term "pixel" is intended to represent an individual sensor element that can sense brightness, and optionally color. Within this definition, the term "pixel" can include a single pixel element in a black and white image sensor or a color image sensor, a single pixel element in a color image sensor that is sensitive to only one color, or a group of positionally related pixel elements in a color image sensor that are each sensitive to a different color.

FIG. 2 diagrammatically illustrates pixel array 200 of image sensor 110. The individual pixels in pixel array 200 are represented in FIG. 2 as circles. Pixel array 200 includes defective pixels, which are designated with a "D" for illustrative purposes. As illustrated, pixel array 200 of image sensor 110 exhibits a variety of different pixel defects, including a completely defective column, a row with numerous defective pixels, a defective spot having multiple closely spaced defective pixels, and a positionally isolated individual defective pixel. Each of these types of defects are illustrated in FIG. 2 in order to demonstrate methods of grouping defective pixels, which are discussed below in greater detail. A defective image sensor frequently will not exhibit all of these types of defects.

Referring again to FIG. 1, analog-to-digital converter 115 translates or converts the analog signals provided by image sensor 110 into a digital format. The digitized signals are provided at output 117, for example in the form of a continuous digital data stream that is indicative of the image to be produced by digital camera 100.

Compensation circuitry 120 receives the digital data stream from analog-to-digital converter 115, and using information indicative of locations of defective pixels that is stored in pixel defect memory 125, compensates for defective pixels by altering the digital data accordingly. Compensation circuitry 120 provides at output 122 compensated digital data representative of the image. In embodiments of the invention, data from defective pixels is replaced by compensation circuitry 120 with data that is an interpolation of data corresponding to nearby pixels. Methods of generating the map of defective pixels stored in memory 125, which identifies the locations of defective pixels in the image sensor array, as well as methods of compensating the digital images using the defective pixel information, are discussed below with reference to the flow diagrams of FIGS. 3–5. Compensation circuitry 120 can be implemented in firmware, or in a microprocessor or a digital signal processor programmed to implement the methods of the invention.

Imaging pipeline 130 receives the compensated digital data from compensation circuitry 120, and adjusts and processes the compensated data to convert it into a desired format. Imaging pipeline 130 can be a microprocessor or a digital signal processor programmed to implement the intended formatting functions. If desired, imaging pipeline 130 and compensation circuitry 120 can both be implemented in a common processor.

Functions implemented by imaging pipeline 130 can include color interpolation and enhancement, contrast enhancement, data compression, and format conversion. For example, imaging pipeline 130 can convert the compensated data from a Red-Green-Blue (RGB) data format into real 24 bit values. Imaging pipeline 130 provides at output 132 formatted image data in a predetermined data storage format. Examples of data storage formats include the Joint Photographic Experts Group (JPEG) format, the Graphics Interchange Format (GIF), the Tag Image File Format (TIFF), or in other formats.

The formatted image data provided at output 132 is stored in memory 135. Memory 135 can be a disc drive, a flash memory chip, a floppy disc, or other types of data storage devices. In some embodiments of the present invention, memory 135 is removable from digital camera 100 for transferring stored digital images to a computer or other device that will be used to display, print, process or otherwise utilize the stored digital photographs.

Optionally included calibration circuitry 150 can be a suitably programmed microprocessor or digital signal processor that detects defective pixels during use of digital camera 100. Circuitry 150 self-calibrates camera 100 by comparing multiple digital images from the camera to detect defective pixels. The comparison used by calibration circuitry 150 can be of digitized image sensor data provided at output 117 of analog-to-digital converter 115, of compensated image data provided at output 122 of compensation circuitry 120, or of formatted data provided at output 132 of imaging pipeline 130. Calibration circuitry 150 can be implemented in a single processor along with compensation circuitry 120 and image pipeline 130. The defective pixel information provided by calibration circuitry 150 is provided to memory 125 for storage in the pixel defect map.

Figure 3:
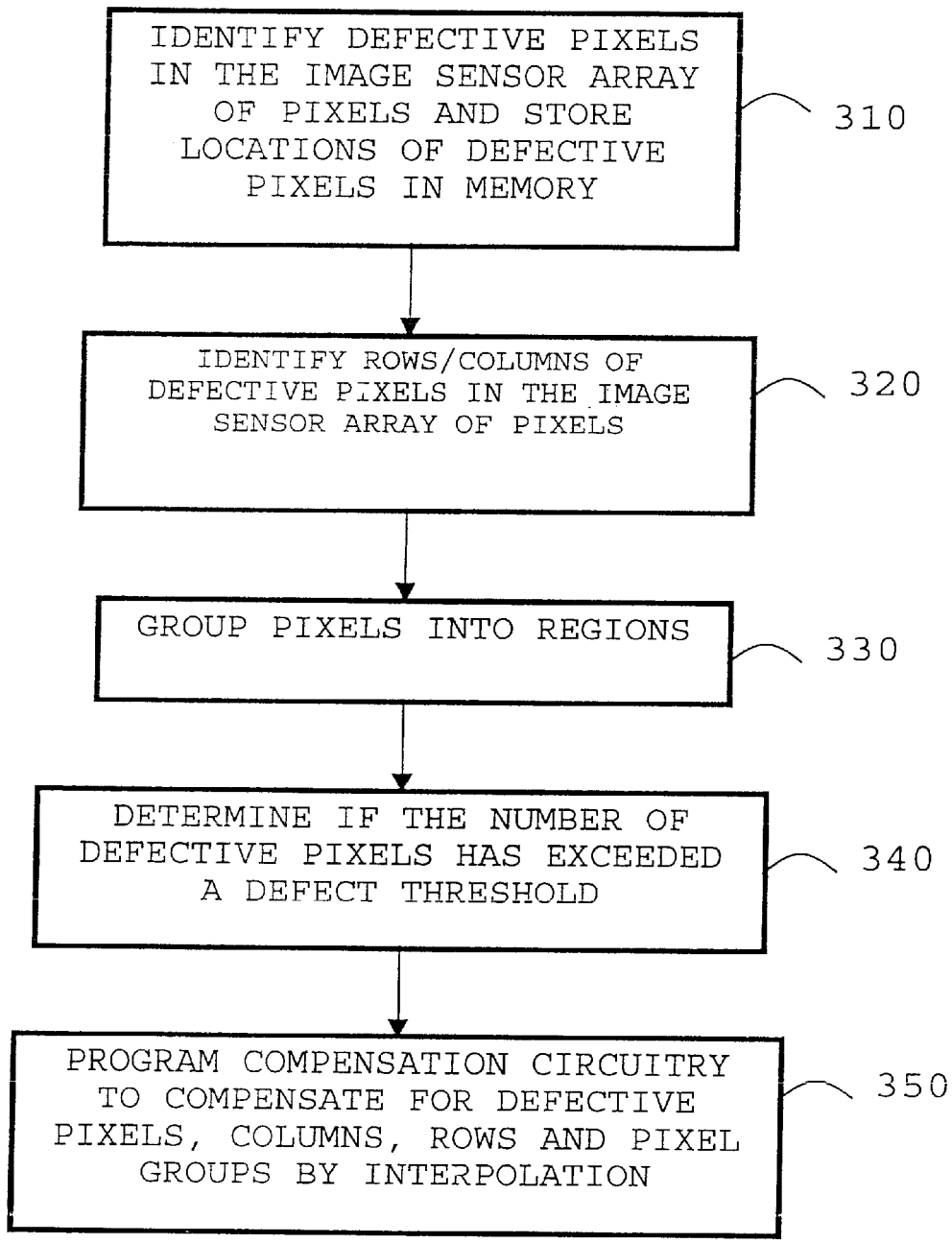
FIG. 3 is a flow diagram illustrating the methods of the present invention of detecting defective pixels, storing defective pixel information and compensating digital photographs.

FIG. 3 is a block diagram illustrating a method of manufacturing, producing, or setting-up digital cameras that allows image sensors having pixel defects to be used, thus increasing the manufacturing yield of image sensors and thereby decreasing the cost of the digital cameras. The general method illustrated in FIG. 3 includes more particular methods of identifying defective pixels in an image sensor, methods of grouping the defective pixels to decrease memory storage and processing requirements, and methods of compensating for the defective pixels. The more particular methods are discussed in detail, and fall within the scope of the invention, both alone and in combination with each other.

As illustrated at block 310 of FIG. 3, the defective pixels in the image sensor array of pixels are identified, and their locations are stored in memory. Identification of defective pixels can be done during manufacture of digital camera 100, or can be accomplished automatically while digital camera 100 is in the hands of a consumer. The procedure for identifying defective pixels, referred to here as "delta images", compares images to look for a pattern that would represent a defect. One or more of the following methods that are more particular can be used to determine which pixels are defective.

Figure 4:
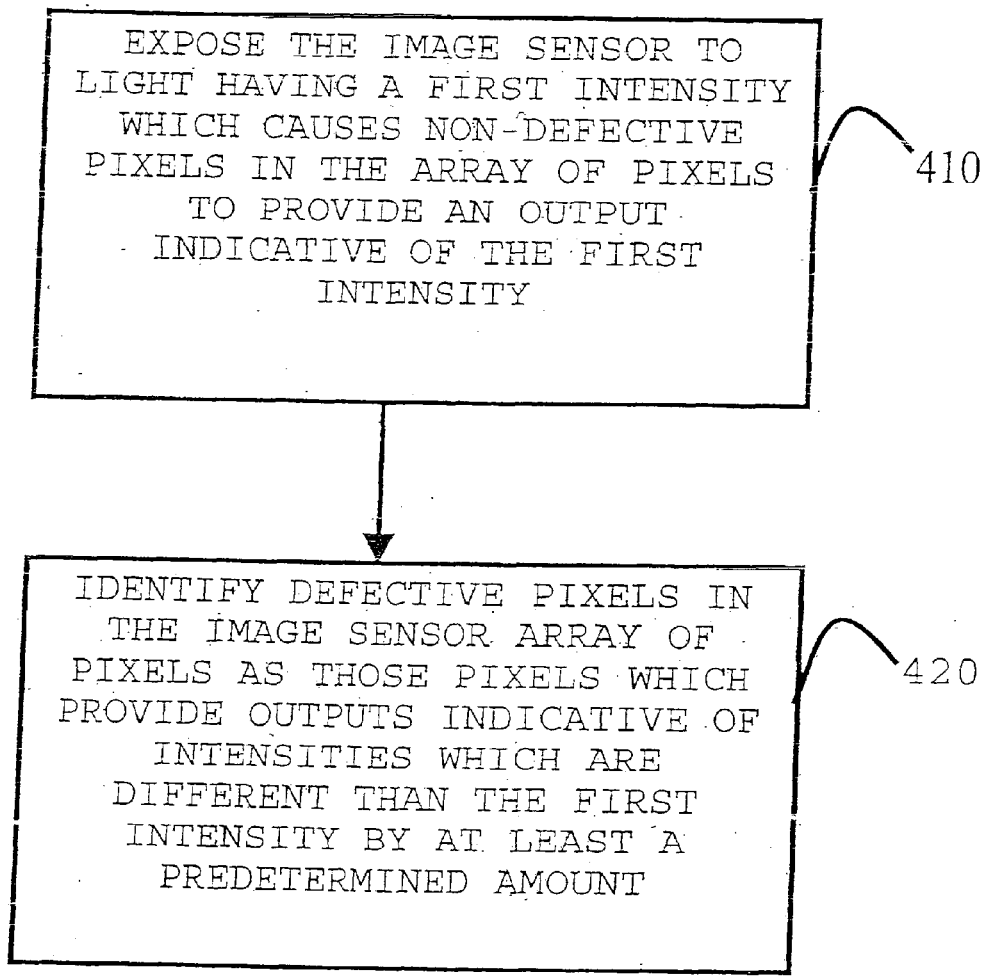
FIGS. 4–5 are flow diagrams illustrating in greater detail methods that are portions of the method shown in FIG. 3.

A first more particular method of identifying defective pixels is illustrated in FIG. 4 and is implemented during manufacture of digital camera 100. To identify defects, image sensor 110 is exposed to light having a first intensity that causes non-defective pixels to provide an output indicative of the first intensity. This step is illustrated at block 410. Then, as illustrated at block 420 in FIG. 4, defective pixels are identified as those pixels that provide outputs indicative of intensities which are different than the first intensity by at least a predetermined amount. The method illustrated in FIG. 4 of detecting defective pixels can be used to detect dropouts, and can then be repeated to detect dropins. Alternatively, this method can be used for simultaneous detection of both dropouts and dropins.

To detect dropouts, the digital representation of an image from sensor 110 is captured while the sensor is exposed to strong (high intensity) white light. Pixels with outputs that do not respond accordingly to this light, as can be determined using the digital representations of the pixel output intensities, will show up as black or dark pixels. These pixels are dropouts and are stored in memory. The outputs of non-defective pixels will be indicative of approximately a maximum possible pixel output.

To detect dropins during manufacture of digital camera 100, the digital representation of an image from sensor 110 is captured while the sensor is exposed to darkness (very low intensity light). Pixels that continue to indicate that light is striking them will show up as white or light pixels. These pixels are dropins and are stored in memory. The outputs of non-defective pixels will be indicative of approximately a minimum possible pixel output.

To detect both dropout and dropin defective pixels simultaneously, the digital representation of an image from sensor 110 is captured while the sensor is exposed to medium intensity level white light. Correctly operating pixels will show up as detecting medium intensity, gray or dim-white light, as can be determined using the digital representations of the pixel output intensities. Pixels that show up as full on (white or near maximum intensity) or full off (black or near minimum intensity) are considered to be defective and are stored in memory.

Figure 5:
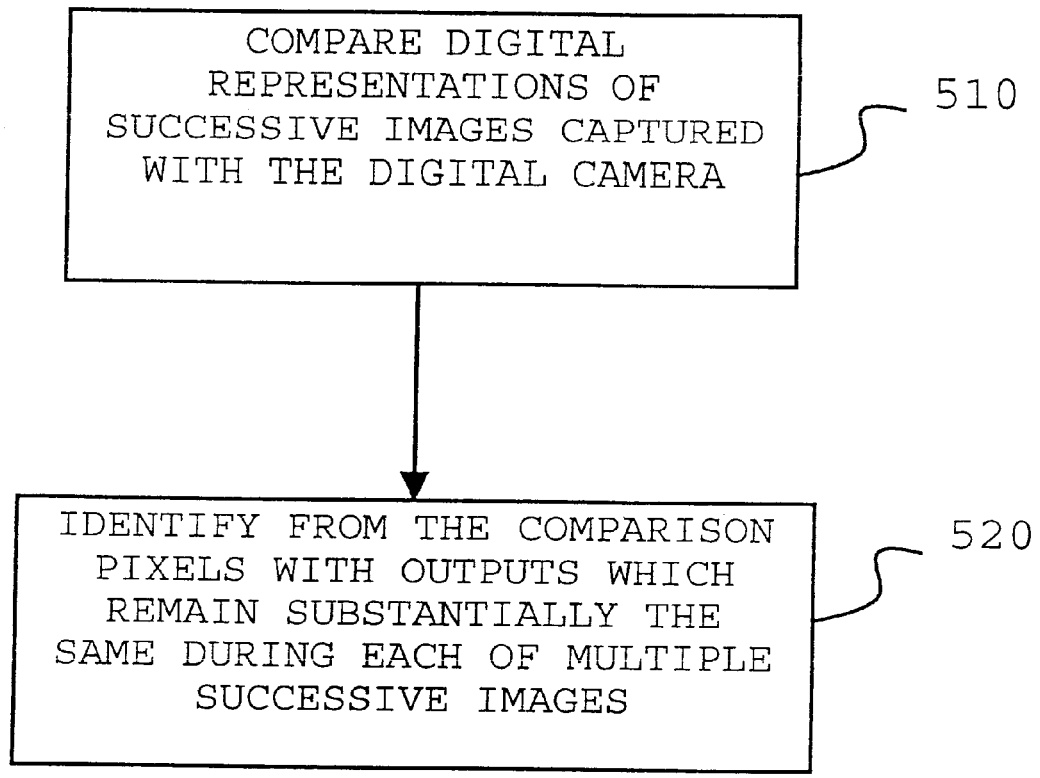

A second method of identifying defective pixels (block 310 of FIG. 3) is illustrated in FIG. 5 and is implemented during use of digital camera 100. This second method can be performed substantially continuously, on a regular basis, or as part of a user-initiated calibration sequence. As shown in FIG. 5 at block 510, when the camera is in a "preview mode", successive images are compared to determine whether pixel outputs change from one image to the next. This comparison is implemented with calibration circuitry 150 shown in FIG. 1. Over time, the number of pixels that remain the same during each image will decrease rapidly. Therefore, as shown at block 520, those pixels with outputs that never change are considered defective. The same procedure can be used for detecting dropins when the lens cap is closed and the image sensor is exposed to darkness.

Referring back to block 310 of FIG. 3, the pixels identified as being defective, for example using the above described methods, are stored in temporary memory for processing as discussed below with reference to blocks 320 and 330. It is not typically necessary to distinguish which pixels are dropouts and which pixels are dropins when storing the set of bad pixels.

As shown at block 320, a next step is to identify bad rows and columns of pixels in the pixel array. A very common defect is for an entire row or column of pixels to go bad. For example, in FIG. 2, column 215 of pixels are all defective. In this step, the list of all defective pixels is sorted and analyzed to find out if an entire row or column is bad. In some embodiments, a threshold is established so that if more than a certain percentage of pixels in a row or column are found to be defective, the entire row or column is categorized and treated as being defective. For example, row 220 illustrated in FIG. 2 has five out of its nine illustrated pixels that are defective. If a threshold of fifty percent were chosen, every pixel in row 220 would be treated as being defective.

After all defective rows and columns are identified, their positions are stored in a permanent defect list in memory 125 of camera 100, and their constituent pixels are removed from the temporary storage of bad pixels. Identifying defective rows or columns reduces the memory storage requirements of identifying defective pixels. For this reason, it can be beneficial to treat a row or column having some non-defective pixels as being entirely defective.

As shown at block 330, after bad rows and columns have been removed from the temporary list of defective pixels, the remaining pixels are sorted and analyzed to look for rectangular groupings of bad pixels. After rectangles are identified, their positions are stored in memory 125 of digital camera 100 and their constituent pixels are removed from the temporary storage of all defective pixels. Note that rectangular shaped regions of pixels include square shaped regions. Also, it can be beneficial to group at least one non-defective pixel with one or more defective pixels (see for example rectangular group 210 illustrated in FIG. 2), and to treat the entire group as defective. Once again, this reduces data storage requirements associated with identifying the defective pixels. Also, ranges of defective pixels can be categorized into a group for the same purpose. The remaining individual defective pixels (for example defective pixel 205 in FIG. 2) are stored in memory 125, and the temporary bad pixel memory can be released. This step reduces the storage requirement for bad pixels.

As shown at block 340, in manufacturing or testing an image sensor for a digital camera, a defect threshold can be set to determine if an excessive number of defects exist in the pixel array. Thus, the list of defective rows, columns, rectangles, ranges and individual pixels are compared to a threshold set by the manufacturer. If the size, location, and quantity of defects are too great, the image sensor should be discarded.

As illustrated in block 350, the compensation circuitry is programmed with an interpolation algorithm. Image interpolation is the process of guessing missing pixels in an image based on surrounding pixels and other information. In this case, pixels surrounding the known defective pixels are used to "guess" what should have been detected by those sensors. Numerous interpolation algorithms, which can be used to compensate for each kind (row, column, rectangle, range, group and individual pixel) of defective region, are known in the art. The interpolation algorithm can be chosen to minimize human perception of interpolated pixels. During use of digital camera 100, after an image is captured, the outputs from defective pixels and pixel regions, stored in permanent memory in the camera, are replaced by interpolated pixel outputs.

Although the present invention has been described with reference to preferred embodiments, workers skilled in the art will recognize that changes may be made in form and detail without departing from the spirit and scope of the invention.

What is claimed is:

1. An apparatus for generating a digital representation of an image, the apparatus comprising:
   an image sensor having an array of pixels that generate analog electrical signals in proportion to intensity of light striking the pixels;
   an analog-to-digital converter coupled to the image sensor and converting the electrical signals into digital data representative of the image;
   pixel defect memory storing information indicative of locations of defective pixels in the image sensor array of pixels, wherein the pixel defect memory stores information indicative of at least one group of pixels by including in the at least one group of pixels at least one non-defective pixel and at least one defective pixel; and
   compensation circuitry coupled to the analog-to-digital converter and to the pixel defect memory, the compensation circuitry compensating the digital data representative of the image using the information indicative of the locations of the defective pixels to provide compensated digital data representative of the image, wherein compensating the digital data to provide the compensated digital data further comprises adjusting portions of the digital data corresponding to each of the pixels in the at least one group.

2. The apparatus of claim 1, and further comprising:
   an imaging pipeline coupled to the compensation circuitry and receiving the compensated digital data representative of the image, the imaging pipeline converting the compensated digital data representative of the image into formatted image data in a predetermined digital image data format; and image storage memory coupled to the imaging pipeline and storing the formatted image data.

3. The apparatus of claim 1, wherein the pixel defect memory stores the information indicative of the at least one group of pixels to be compensated by the compensation circuitry such that the at least one group of pixels to be compensated includes all pixels in a first row of the array of pixels.

4. The apparatus of claim 3, wherein the pixel defect memory stores the information indicative of the at least one group of pixels to be compensated by the compensation circuitry such that the at least one group of pixels to be compensated includes all pixels in the first row of the array of pixels if a number of defective pixels in the first row of pixels exceeds a predetermined threshold.

5. The apparatus of claim 1, wherein the pixel defect memory stores the information indicative of the at least one group of pixels to be compensated by the compensation circuitry such that the at least one group of pixels to be compensated includes all pixels in a first column of the array of pixels.

6. The apparatus of claim 5, wherein the pixel defect memory stores the information indicative of the at least one group of pixels to be compensated by the compensation circuitry such that the at least one group of pixels to be compensated includes all pixels in the first column of the array of pixels if a number of defective pixels in the first column of pixels exceeds a predetermined threshold.

7. The apparatus of claim 1, wherein the pixel defect memory stores the information indicative of the at least one group of pixels to be compensated by the compensation circuitry such that the at least one group of pixels to be compensated includes all pixels in a first rectangular shaped region of in the array of pixels.

8. The apparatus of claim 1, wherein the pixel defect memory stores the information indicative of the at least one group of pixels to be compensated by the compensation circuitry such that the at least one group of pixels to be compensated includes all pixels in a range of consecutively positioned pixels in the array of pixels.

9. The apparatus of claim 1, wherein the compensation circuitry compensates the digital data representative of the image by replacing data associated with defective pixels with data interpolated from non-defective pixels.

10. A method of manufacturing a digital camera that includes an image sensor having an array of pixels, the method comprising:

identifying defective pixels in the image sensor array of pixels by grouping at least one non-defective pixel with at least one defective pixel in a group, and categorizing the group as containing only defective pixels; and storing in memory of the digital camera information indicative of locations of defective pixels in the image sensor array of pixels, including storing in memory information indicative of the location of the group.

11. The method of claim 10, wherein identifying defective pixels further comprises:

exposing the image sensor to light having a first intensity, wherein in response to the light having the first intensity non-defective pixels in the array of pixels provide an output indicative of the first intensity; and identifying the defective pixels in the image sensor array of pixels as those pixels that provide an output indicative of intensities which are different than the first intensity by at least a predetermined amount.

12. The method of claim 11, wherein exposing the image sensor to light having the first intensity includes exposing the image sensor to high intensity white light.

13. The method of claim 11, wherein exposing the image sensor to light having the first intensity includes exposing the image sensor to darkness.

14. The method of claim 11, wherein exposing the image sensor to light having the first intensity includes exposing the image sensor to light having an intensity that causes non-defective pixels in the array of pixels to provide an output which is substantially in the middle of a maximum possible pixel output and a minimum possible pixel output.

15. The method of claim 10, and further comprising identifying rows and columns of defective pixel elements and storing in memory information indicative of the locations of the defective rows and columns.

16. A method of compensating a digital representation of an image captured with a digital camera having an image sensor, the method comprising:

obtaining a digital representation of an image captured with an image sensor;

retrieving defective pixel information from memory in the digital camera, the defective pixel information being indicative of locations of a group of pixels in the image sensor to be compensated, the group of pixels to be compensated including at least one defective pixel and at least one non-defective pixel; and replacing portions of the digital representation of the image associated with all of the pixels in the group of pixels with data interpolated from portions of the digital representation of the image associated with pixels which are not in the group.

* * * * *